(12) United States Patent
Schmidt et al.

(10) Patent No.: US 10,328,401 B2
(45) Date of Patent: Jun. 25, 2019

(54) VALVE FOR A WATER-SUPPLY SYSTEM

(71) Applicant: Franz Kaldewei GmbH & Co. KG, Ahlen (DE)

(72) Inventors: Thomas Schmidt, Muenster (DE); Tobias Meyer, Warendorf (DE)

(73) Assignee: FRANZ KALDEWEI GMBH & CO. KG, Ahlen (DE)

( * ) Notice: Subject to any disclaimer, the term of this patent is extended or adjusted under 35 U.S.C. 154(b) by 59 days.

(21) Appl. No.: 15/342,652

(22) Filed: Nov. 3, 2016

(65) Prior Publication Data

US 2017/0120207 A1    May 4, 2017

(30) Foreign Application Priority Data

Nov. 4, 2015    (DE) .......................... 10 2015 118 938

(51) Int. Cl.
*B01F 13/04*    (2006.01)
*B01F 3/04*    (2006.01)
(Continued)

(52) U.S. Cl.
CPC ........... *B01F 13/042* (2013.01); *A61H 33/02* (2013.01); *B01F 3/0446* (2013.01);
(Continued)

(58) Field of Classification Search
CPC ...... F04B 13/00; F04B 49/065; B01F 13/042; B01F 15/0258; B01F 5/106; B01F 3/04503; B01F 3/0446; B01F 5/12; F16K 17/30; G05D 7/0133; A61H 2033/0033; A61H 2033/023; A61H 2033/021; A61H 2033/022; A61H 2201/50; A61H 33/02
See application file for complete search history.

(56) References Cited

U.S. PATENT DOCUMENTS 8,579,266 B2    11/2013    Cunningham et al.
8,720,867 B2    5/2014    Cunningham et al.
(Continued)

FOREIGN PATENT DOCUMENTS

DE    202011110581 U    12/2014
EP    1614614 A    8/2012
(Continued)

OTHER PUBLICATIONS

EPO translation of Taichi ES 2392450 published Dec. 10, 2012 (Year: 2012)*
Cashco "Basic Operation Operation and Function Function of Control Control Valves" published Feb. 1999 (Year: 1999).*

*Primary Examiner* — Stephen Hobson
(74) *Attorney, Agent, or Firm* — Andrew Wilford

(57) ABSTRACT

A valve for a plumbing system has a housing with an inlet and an outlet and a valve body movable in the housing between a throttle position with a decreased a flow cross section and reduced flow between the inlet and outlet and an open position with a large flow cross section and free flow between the inlet and outlet. Structure in the valve body applies hydraulic pressure from the inlet or outlet to the valve body to shift same into the throttle position when a pressure differential between the inlet and the outlet exceeds a specified value and into the open position in the absence of a pressure differential between the inlet and the outlet.

10 Claims, 10 Drawing Sheets

(51) Int. Cl.
*B01F 5/12* (2006.01)
*G05D 7/01* (2006.01)
*F16K 17/30* (2006.01)
*B01F 5/10* (2006.01)
*B01F 15/02* (2006.01)
*A61H 33/02* (2006.01)
*A61H 33/00* (2006.01)

(52) U.S. Cl.
CPC .......... *B01F 3/04503* (2013.01); *B01F 5/106* (2013.01); *B01F 5/12* (2013.01); *B01F 15/0258* (2013.01); *F16K 17/30* (2013.01); *G05D 7/0133* (2013.01); *A61H 2033/0033* (2013.01); *A61H 2033/021* (2013.01); *A61H 2033/022* (2013.01); *A61H 2033/023* (2013.01); *A61H 2201/50* (2013.01)

(56) References Cited

U.S. PATENT DOCUMENTS

| | | | |
|---|---|---|---|
| 8,881,757 B2 * | 11/2014 | Melcher | B05B 12/14 137/467.5 |
| 9,060,916 B2 | 6/2015 | Cunningham et al. | |
| 2010/0001221 A1 * | 1/2010 | Hasunuma | F16K 31/04 251/318 |
| 2018/0239370 A1 * | 8/2018 | Perry, Jr. | G05D 7/0133 |

FOREIGN PATENT DOCUMENTS

| | | | |
|---|---|---|---|
| ES | 2392450 | * | 12/2012 |
| JP | 2008290050 | B | 12/2008 |
| WO | 2007051260 | A | 5/2007 |

* cited by examiner

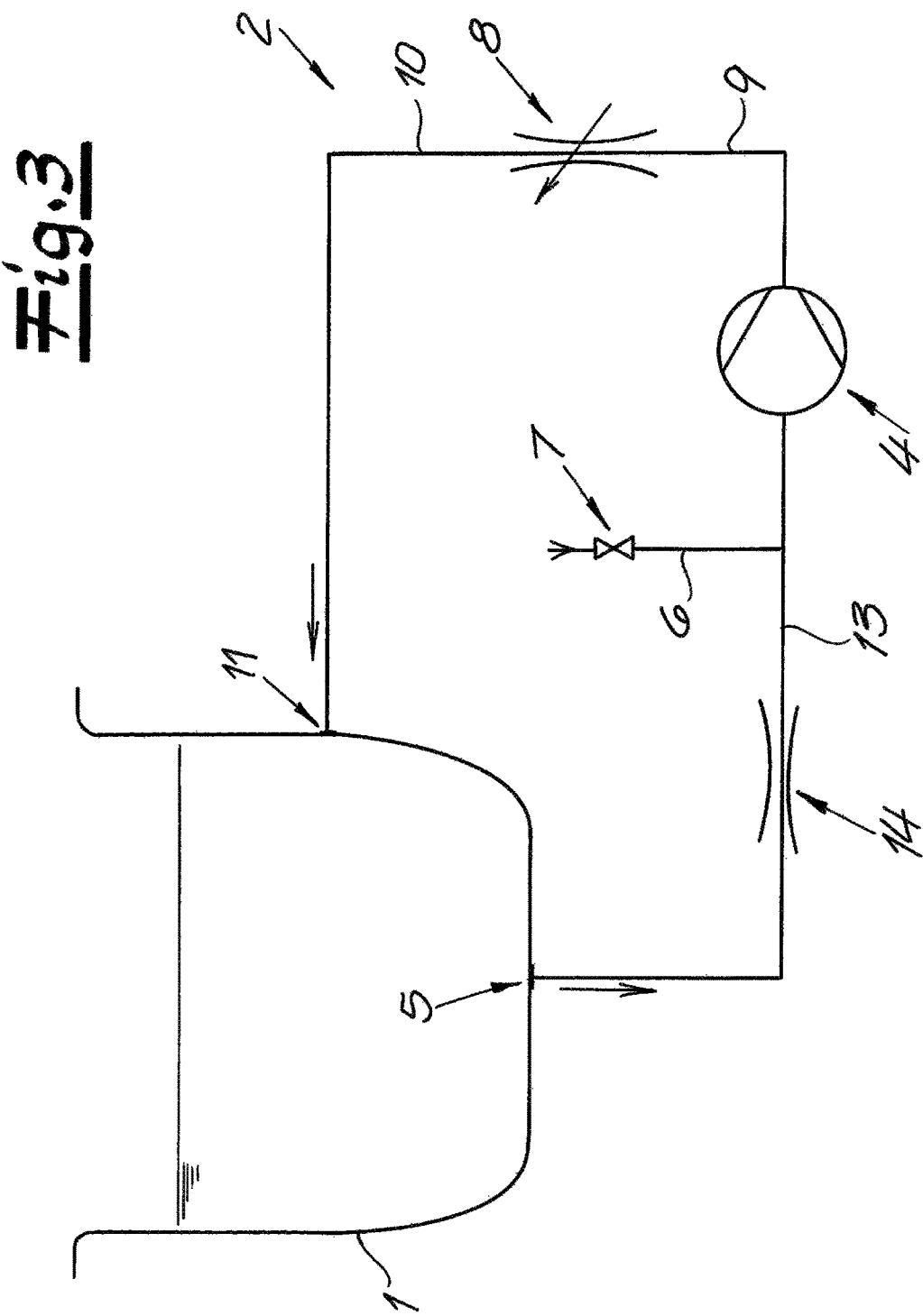

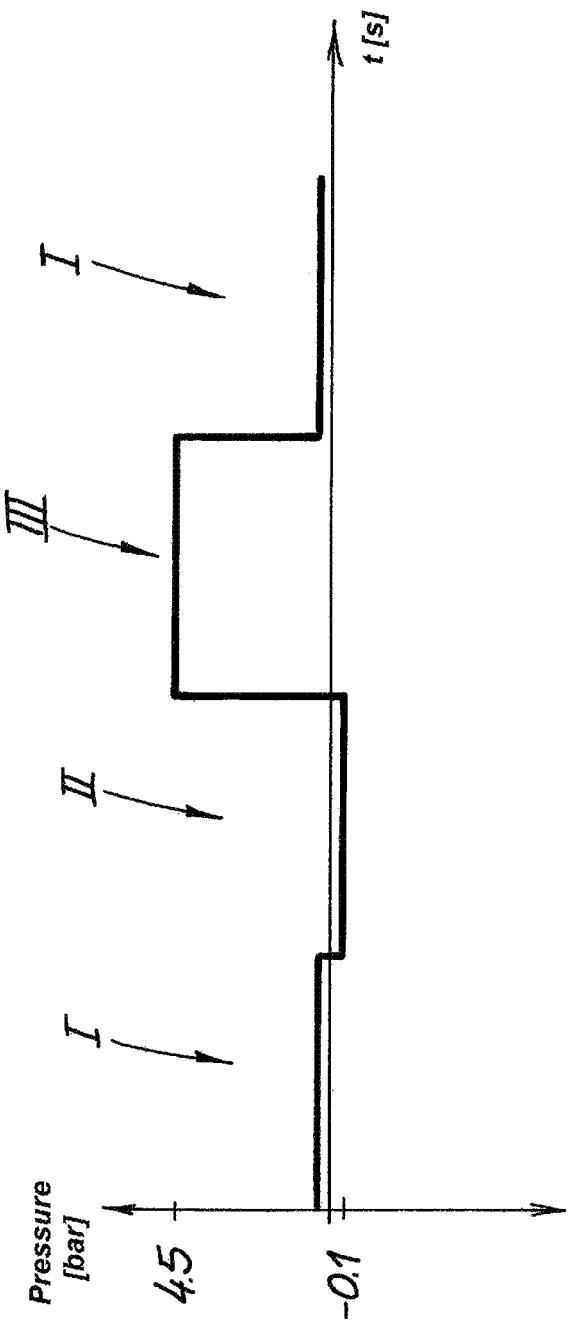

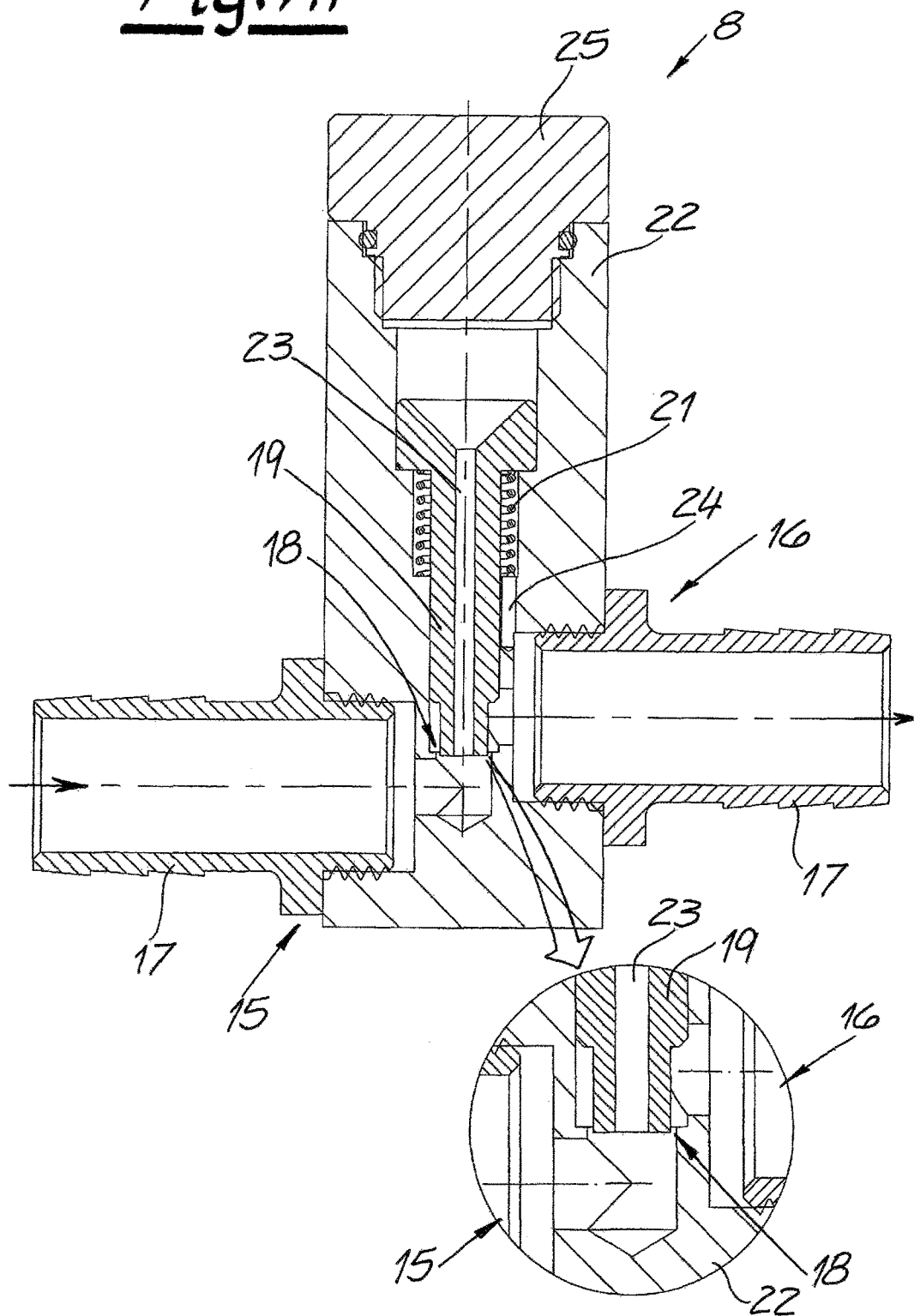

VALVE FOR A WATER-SUPPLY SYSTEM

FIELD OF THE INVENTION

The present invention relates to valve. More particularly this invention concerns such a valve used in a bathwater circulating system.

BACKGROUND OF THE INVENTION

A fluid valve such as usable in a household plumbing system typically has a housing with an inlet and an outlet, and a valve body is fed so as to move longitudinally within the housing. In practice, such fluid valves are used for varying a flow cross section of a fluid passage.

The present invention specifically relates to a fluid valve whose flow cross section is reduced in a throttle or flow-impeding position, so that on flow through the valve a pressure drop results between the inlet and the outlet. As a result, a pressure differential is present between the inlet and the outlet and the amount of liquid flowing through the fluid valve is limited.

Consequently, within the context of the invention, the term pressure differential between the inlet and the outlet refers to a higher pressure at the inlet than at the outlet.

The fluid valve may be provided as a component of a plumbing system for producing bubbles. There, for example a bathwater circulating system is provided that includes a pump, an air-supply conduit that is provided with an intake throttle and that opens into a water-supply conduit that is connected to the intake port of the pump, and a fluid valve connected to the output port of the pump, the fluid valve being used in the described arrangement as a pressure-reducing valve.

The microbubbles produced by the bathwater circulating system are very fine and are similar in their structure to a mist or very fine foam. On the skin of a user, a vitalizing effect is achieved, and at the same time a particularly gentle and pleasant tingling can be felt.

The functioning mode of the bathwater circulating system is based on the fact that under application of pressure, ambient air or another gas is dissolved in the bathwater, and subsequently, as a result of depressurization, minute microbubbles form in the air/water mixture.

A bathwater circulating system with the features as described above is known from JP 2008-290050. In this system, bathwater is drawn from a filled bathtub through a pump and is mixed with ambient air upstream of the pump. Superatmospheric pressure is applied to the air/water mixture by the pump, as a result of which part of the ambient air dissolves in the bathwater.

The mixture is then passed into a fluid settling chamber in which any excess ambient air in the form of residual large bubbles in the mixture are separated from the liquid. As a result of the separation of the liquid phase from the gaseous phase, the bathwater extracted from the fluid settling chamber holds only ambient air in a dissolved form. The bathwater with the ambient air dissolved therein is then passed to a throttle unit with nozzle-shaped constrictions, and as a result of the pressure drop on the throttle device, the ambient air previously dissolved in the bathwater in the form of very fine bubbles, which are also referred to as microbubbles, is released.

A bathwater circulating system is known from U.S. Pat. Nos. 8,579,266, 8,720,867, and 9,060,916 (EP 2 226 056, EP 2 226 057, and EP 2 703 071) in which bathwater is drawn by a pump, and a gas, in particular ambient air, is supplied only after pressure has been applied onto the bathwater using the pump. The air/water mixture thus formed is passed to a fluid settling chamber for separating any excess ambient air.

A similar arrangement is described in WO 2007/051260, and the bathwater is enriched with ozone.

According to DE 20 2011 110 581, bathwater is enriched with $CO_2$ that is held in a gas container, and a compensation tank is provided downstream of a pump.

When using the fluid valve as a pressure-reducing valve in a plumbing system, there is a risk that the fluid valve becomes clogged up with impurities and will become impaired in its function thereby. A similar risk of clogging with impurities is present also in other applications.

OBJECTS OF THE INVENTION

It is therefore an object of the present invention to provide an improved valve.

Another object is the provision of such an improved valve, in particular for a bathwater circulating system that overcomes the above-given disadvantages, in particular that is characterized by high operational security and low maintenance requirements.

Further, a water circulating system is to be provided that has the inventive fluid valve as a pressure-reducing valve.

SUMMARY OF THE INVENTION

A valve for a plumbing system has according to the invention a housing with an inlet and an outlet and a valve body movable in the housing between a throttle position with a decreased flow cross section and reduced flow between the inlet and outlet and an open position with a large flow cross section and free flow between the inlet and outlet. Structure in the valve body applies hydraulic pressure from the inlet or outlet to the valve body to shift same into the throttle position when a pressure differential between the inlet and the outlet exceeds a specified value and into the open position in the absence of a pressure differential between the inlet and the outlet.

The valve of this invention has a pressure controlled adjustment mechanism for the valve body that moves the valve body into the throttle position that reduces a flow cross section if a pressure differential between the inlet and the outlet exceeds a specified value, and moves it into an open position in the case of the absence of a pressure differential.

The valve body guided in the housing in an axial direction of movement can automatically assume the throttle position and the open position, and the pressure controlled adjustment mechanism can operate without any motors, actuators or the like. The movement of the valve body between the throttle position and the open position can be effected merely by way of a suitable structure and geometry of the valve body and of the adjustment mechanism.

The present invention makes it possible, in case of a specified pressure differential, i.e. superatmospheric pressure at the inlet and ambient at the outlet, for the valve body to be in the throttle position that reduces the flow cross section, so that the geometric ratios are then exactly predetermined and for example fine gas bubbles may be formed by the pressure differential upstream from the fluid valve, when in the fluid fed in the corresponding gas is initially dissolved under pressure.

It is to be noted here that in the case of the absence of a pressure differential, the valve body is automatically moved into the open position by the adjustment mechanism, as a result of which a larger flow cross section is then exposed and any previously deposited impurities or particles caught in the narrow gap between the valve body and the valve housing are released. If then liquid is again fed to the inlet, it is to be noted that the pressure differential between the inlet and the outlet is comparatively low due to the large flow cross section in the open position of the valve body, however this pressure differential is sufficient for the adjustment mechanism to move the valve body into the throttle position under pressure control. The pressure differential then continues to increase, as a result of which a working pressure results.

Against this backdrop, the adjustment mechanism may be designed such that the valve body assumes the throttle position at a pressure differential between 0.5 bar and 3 bar.

According to a preferred embodiment, the structure of the adjustment mechanism is actually a suitable geometry of the housing and of the valve body.

According to a preferred embodiment of the invention the valve body has a first end face facing in the direction of the inlet and a second oppositely directed end face exposed in a pressure chamber formed in the housing and connected to the inlet via a bypass passage. The second end face is larger than the first end face so that the pressure in the intake port exerts a stronger force on the larger second face and urges the first face into the inlet, throttling flow therethrough.

The described embodiment ensures that as a result of superatmospheric pressure on the inlet, the valve body is moved into the throttle position in respect of the area ratio between the two end faces. Preferably, an axial movement of the valve body in the direction of the inlet is carried out here.

The bypass passage ensures that in the pressure chamber, the same or about the same pressure is present as at the inlet. The bypass passage may here extend through the housing or through the valve body. If the bypass passage extends through the valve body, for instance along a central axis of the valve body, both the first end face and the second end face are correspondingly reduced in area.

According to a preferred development of the invention, a compensation chamber extending over a central section of the valve body in the housing is connected to the outlet via a connection passage. As a result of such a connection in the type of a vent the valve body can freely move within the housing.

The valve body may be guided through slide bushings and/or seals in the housing. A corresponding sealing is preferably provided on at least one side of the compensation chamber.

It is to be taken into account here that the valve body should be easily movable and that a complete sealing is not required. The seal rings and/or slide bushings can therefore be selected such that only minor leakage flows are accepted. With regard to a good movability of the valve body, seal rings with an elastic lip (lip seals) are advantageous.

According to the invention in the absence of a pressure differential, for example if the supply of liquid is interrupted, the fluid valve leaves the throttle position and thus the actual working position, and goes into an open position, as a result of which any clogged particles can be moved, i.e. flushed out of the previously constricted valve gap. In principle, the valve body and the housing may be matched to each other in such a way that any impurities are scraped off the valve body.

In spite of the described automatic cleaning, it may be advantageous if the housing can be opened for maintenance purposes. To this end, the housing may have a releasable closure, for example in the form of a plug or a cap, so that the valve body is accessible through this closure for cleaning, removal, and/or replacement. The closure is preferably screwed on and may for example cover an end of the pressure chamber. In order to be able to maintain the valve body, however, also other embodiments such as for example a two-piece housing would be conceivable.

As described above, superatmospheric pressure on the inlet side through the pressure-controlled adjustment mechanism causes the valve body to be moved into the throttle position, as a result of which the superatmospheric pressure increases even further. In order to move the valve body, in the case of the absence of a pressure differential, back into its open position, a compression spring may be provided that urges the valve body into the open position. The compression spring is preferably a simple coil spring.

The subject matter of the invention is also a water circulating system, in particular a bathwater circulating system for producing bubbles using a pump, an air-supply conduit provided with an indeed throttle and opening into a water-supply conceit connected to the intake port of the pump and is provided with the fluid valve described above, which is connected to an output port of the pump and serves as a pressure-reducing valve.

The fluid valve as a pressure-reducing valve may be preferably connected directly, without the interposition of a fluid settling chamber provided for separating bubbles, to a pump output port by an output conduit.

Within the context of such an embodiment, a fluid settling chamber that is always provided according to the prior art is dispensed with, and as a result of the pressure-reducing valve on the one hand and the inflow throttle, in particular the inlet valve for the ambient air drawn in on the other hand, the pressure, flow and volume ratios between bathwater and ambient air can be adjusted in such a way that on the high-pressure output side, the ambient air drawn in can be dissolved completely or at least to a large extent in the bathwater, so that upstream of the pressure-reducing valve no, or no substantial amount of, undissolved ambient air remains, and thus the formation of small bubbles, which can also be referred to as microbubbles, is not or at least not substantially affected.

Within the context of the invention, particularly low operation noises are supposed to be made possible, in order to ensure that the user comfort is not affected. Also against this backdrop, the elimination of a fluid settling chamber is of advantage because this may serve, in the known embodiments, as a resonator that increases noise. Further, the separation of larger bubbles in a fluid settling chamber according to the prior art leads to increased operating noises as a result of the bursting of individual bubbles, which may, depending on the embodiment, be perceived as a type of bubbling noises. Added to this, cross sectional changes may occur at the transitions of the fluid settling chamber, which could also lead to flow noises.

With regard to noise generation, preferably plastic tubes and pipes are used for plumbing that compared to metallic pipes have a very low noise transmission.

The bathwater circulating system is preferably provided for recirculating bathwater that was previously extracted from a bathtub. Moreover, the bathwater circulating system may additionally or alternatively also be operated with fresh water or at least a portion of fresh water, and if necessary also mixing or switching between recirculated bathwater and fresh water may be carried out.

In the context of the described preferred embodiment, a fluid settling chamber is dispensed with, so that according to a preferred embodiment of the invention, the preferably provided connection conduit between the pump output port and the pressure-reducing valve has a consistent cross section, i.e. a cross section that is constant over the length thereof. In the case of the connection line, this may for example be a simple pipe or a tube.

In order to ensure within the connection conduit that the ambient air can be dissolved in the pumped bathwater to a sufficient degree, a sufficient length of connection conduit is to be provided. The length of the connection conduit between the pump output port and the pressure-reducing valve is preferably more than 100 mm, particularly preferably more than 300 mm, for example between 350 mm and 500 mm.

In principle improved mixing and a higher degree of saturation of ambient air in the bathwater are achieved if the connection conduit is somewhat long.

The pressure-reducing valve is necessary on the one hand to build up dynamic pressure against the pump so as to enable the ambient air to dissolve in the bathwater.

The parameters of the pressure-reducing valve and of the pump are preferably matched to each other in such a way that during the operation of the bathwater circulating system for producing microbubbles in the connection line, a superatmospheric pressure of for example 2.5 bar to 7 bar, preferably between 3.5 bar and 5 bar in relation to the ambient pressure of the bath tub is achieved. As the superatmospheric pressure increases, also the amount of ambient air that can be dissolved in the bathwater increases. On the other hand, the bathwater circulating system should be operated safely also in the case of an embodiment that is as simple as possible, and for this reason even higher pressures could be disadvantageous.

In addition, the pressure drop across the pressure-reducing valve is the cause for the formation of the microbubbles owing to the fact that as the pressure in the bathwater decreases, the solubility of ambient air abruptly decreases, so that the microbubbles develop. In order to be able to form as many small bubbles as possible, an abrupt pressure drop is advantageous.

Apart from the pressure drop, also the cross section modifications to the pressure-reducing valve may lead to the formation of microbubbles by cavitation. Optimal operation characteristics may easily be found within the context of the invention by trials, even if in the case of a certain arrangement, the effects leading to bubble formation cannot be individually quantified or distinguished.

Downstream of the pressure-reducing valve, there is in principle the risk that the produced small bubbles (microbubbles) connect with each other and thus form larger bubbles that are less able to trigger the desired soft pearl effect on a user. Against this backdrop, too long a section between the pressure-reducing valve and an liquid inlet of the bathtub might be of disadvantage.

Surprisingly, the formation and stability of microbubbles may also be enhanced by using usual bath additives such as for example bath oil, bath salt, alcohol, soap or the like, because such additives can inhibit coalescence of the microbubbles, i.e. merging of the microbubbles to form larger bubbles. It is also assumed that as a result of the reduction of the surface tension due to the bath additives mentioned, even smaller bubbles may be formed that are even more pleasant to the user.

As has already been explained above, according to the present invention, the flow volumes of bathwater and ambient air as well as the flow and pressure ratios of the fluids or fluid mixtures should be adjusted in such a way that under pressure application, without an additional fluid settling chamber, a complete or at least virtually complete dissolution of the ambient air in the bathwater is achieved. The amount of ambient air drawn in is determined by the (static or dynamic) subatmospheric pressure on the suction side of the pump as well as the inlet valve. Preferably, this is an adjustable valve, in particular an adjustable needle metering valve that can be used for carrying out a fine adjustment. In principle, however, also any other valve or a fixed aperture may be used.

Since the bathwater circulating system is made up of components that are matched to each other, a suitable setting of such an adjustable valve may be specified in the factory, and on the basis of this, if necessary, an adjustment or correction may be carried out during the installation or maintenance thereof.

The bathwater circulating system may be designed and arranged in such a way that the adjustable inlet valve is accessible directly or after removing a cover, an inspection flap or the like. In principle, also a remote adjustment by way of a Bowden cable or other mechanical couplings may be provided. Finally, an electronic control is possible, and for this purpose corresponding actuators or positioning means may be provided on the adjustable inlet valve.

As has already been described above, in the case of a certain flow volume, the pressure-reducing valve creates backpressure and thus also the required pressure drop, and the pressure-reducing valve is located, during the generation of microbubbles, in a throttle position with an abruptly decreasing cross section. Preferably, this throttle position, too, may be modified either at the pressure-reducing valve for set-up and maintenance reasons or via a remote adjustment mechanism.

In principle, the pressure-reducing valve and the inlet valve may be adjusted in an installation in such a way that even with different operating parameters such as for example a varying water temperature, stable and advantageous operating parameters are achieved. The operating position of the inlet valve and of the pressure-reducing valve will then be modified for maintenance purposes.

Such an embodiment of the bathwater circulating system is, from a practical point of view and in respect of the overall costs, of advantage and as a rule also entirely sufficient in order to satisfy the needs of a user.

When operating the bathwater circulating system for producing bubbles, such a pressure-reducing valve is automatically in the flow-impeding position. If, on the other hand, the pump is shut down and the pressure built up by the pump is below a predetermined threshold value, the pressure-reducing valve shifts to an open position in which a greater flow cross-section is opened up.

Both due to the trailing bathwater and also the renewed start-up of the bathwater circulating system upstream of closing the pressure-reducing valve, impurities are flushed from the then opened gap.

Within the framework of the invention, preferably a centrifugal pump is provided as pump. The pump is to be chosen such that, at the lowest possible cost and a low development of noise, a good thorough mixing of the drawn-out bathwater and aspirated ambient air is achieved.

The subject matter of the invention is also a bathtub, in particular with and the bathwater circulating system described above. The bathtub can for example also be a sitz bath, a foot bath, a washbasin or the like. The intake port of the pump is connected to a drain or intake opening of the bathtub, and the exit of the pump is connected to a fluid outlet of the bathtub via the output conduit and the pressure-reducing valve and preferably a second output conduit connecting the pressure-reducing valve to the fluid outlet. If the intake port of the pump is connected to a drain opening of the bathtub, an integrated design with a drain is the result. However, the bathwater can be drawn away also separately by an intake opening, which is located, like a drain opening, on the bottom or also a side wall of the bathtub.

The fluid outlet can be located in particular on a side wall or on the bottom of the bathtub. Also, the fluid outlet can in principle be combined with an inlet or outlet. Furthermore, a combination with a further functional element, for example a whirl nozzle or a light, is also possible.

Finally, the invention also relates to a method of operating the bathwater circulating system described above, on a bathtub. For this, bathwater is drawn at the intake port of the pump out of the filled bathtub, and, in the drawn-out bathwater, a subatmospheric pressure is produced on the intake port of the pump vis-à-vis the ambient pressure, with the result that ambient air is drawn in via the air-supply conduit connected to the intake valve. The intake can be produced both by a dynamic subatmospheric pressure according to the Venturi principle and also by a static subatmospheric pressure on the intake port, and, self-evidently, both effects can be combined with each other.

The mixture of drawn-out bathwater and aspirated ambient air is drawn in by the pump and pressurized, and the ambient air is dissolved at least partly in the bathwater when pressurized. The bathwater with the ambient air at least partially dissolved therein is then decompressed at the pressure-reducing valve so that a mixture of bathwater and bubbles, in particular very fine bubbles, forms. Finally, the mixture of bathwater and bubbles is let out into the bathtub.

The flow rate of the bathwater at the intake port is preferably between 10 l/min (liters per minute) and 20 l/min, and—relative to the volume under ambient pressure—the flow rate of the ambient air there is between 0.5 l/min and 2 l/min, with the result that a volume ratio of between 10:2 and 40:1, preferably approximately 10:1, results for the drawn-out bathwater and the aspirated ambient air.

The mixture of drawn-out bathwater and aspirated ambient air is pressurized by the pump relative to ambient pressure, to a superatmospheric pressure of between preferably 2.5 bar to 7 bar, and particularly preferably between 3.5 bar and 5 bar.

As already explained above, according to a preferred embodiment of the invention, the pressure-reducing valve has a pressure-controlled adjustment mechanism in order to move between a flow-impeding position and an open position. Correspondingly, according to a preferred embodiment of the method the pressure-reducing valve automatically shifts from a flow-impeding position into an open position after switching off the pump and correspondingly a drop-off in superatmospheric pressure and opens up an enlarged flow cross-section. Cleaning takes already by running the drawn-out bathwater through the pressure-reducing valve.

Further, after switching the pump on, any impurities may be flushed out of the pressure-reducing valve that is in the open position, upstream of the pressure-reducing valve automatically moves, as a result of the corresponding pressure control, from the open position to the throttle position.

BRIEF DESCRIPTION OF THE DRAWING

The above and other objects, features, and advantages will become more readily apparent from the following description, reference being made to the accompanying drawing in which:

FIG. 3 is a schematic view of the bathwater circulating system;

FIG. 4 is a diagram showing how the bathwater circulating system works;

FIGS. 7A and 7B are views like FIGS. 5A and 5*b* showing a third embodiment of the valve.

SPECIFIC DESCRIPTION OF THE INVENTION

Figure 1:
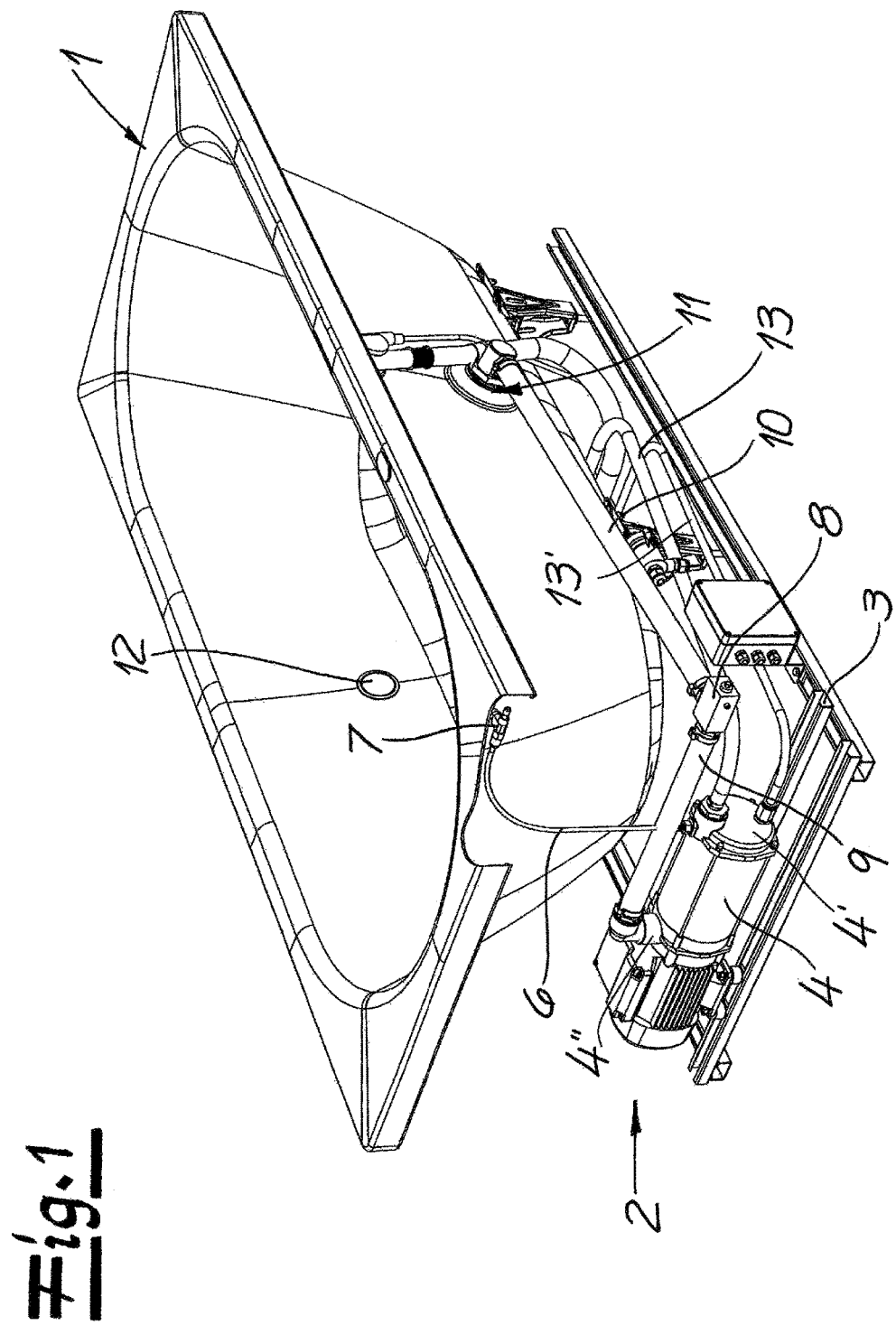
FIG. 1 is a perspective view with a bathwater circulating system according to the invention.

As seen in FIG. 1, a bathtub 1 sitting on a base 3 has a bathwater circulating system 2 that circulates bathwater through the bathtub 1. This bathwater is provided according to the invention with small bubbles in order to increase well-being for a user and achieve a positive influence on the skin of a user.

Figure 2:
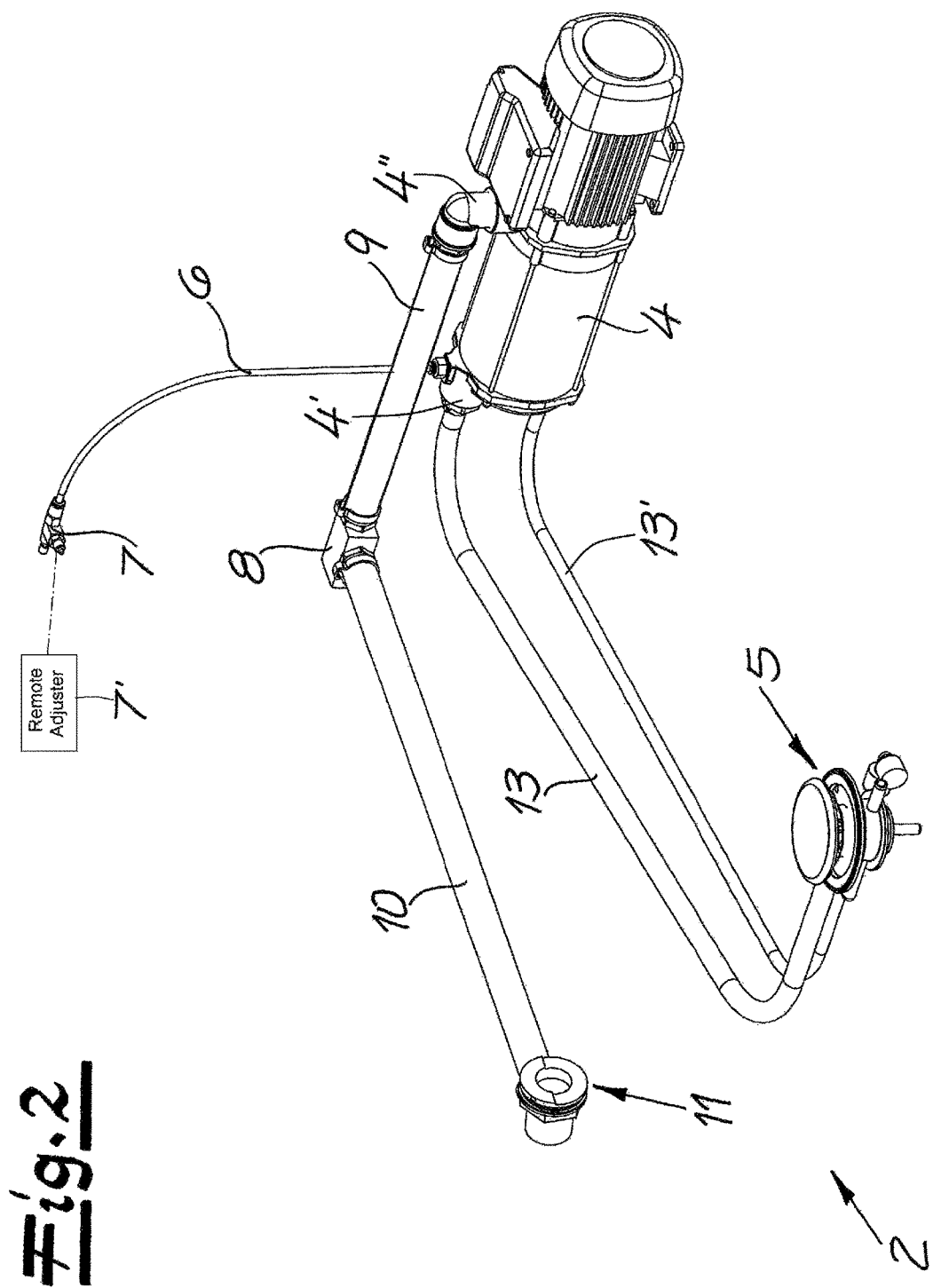
FIG. 2 a perspective detail view showing only the bathwater circulating system.

FIGS. 1 and 2 show how a centrifugal pump 4 having an intake port 4' and an output port 4" draws bathwater out of the tub 1 through a floor drain 5 connected to the intake port 4'. An air-supply conduit 6 having an intake valve 7 is also connected to the intake port 4'. An intake valve 7 at an upstream end of the air-supply conduit 6 is below an upper edge of the tub 1, and is preferably a needle valve that makes possible a precise dosing of the ambient air that is drawn in there. Preferably, the intake valve 7 can be adjusted directly by hand or with a tool, and it is normally protected by an inspection flap or a cover, or can also be mounted to be freely accessible. In the case of free accessibility, the intake valve can be arranged for example at an upper section of the tub 1 (e.g. outer edge or upper flange). However, in principle, a mechanical or electronic remote adjustment is also possible so that the intake valve 7 can then also be mounted in an inaccessible location.

The subatmospheric pressure produced by the pump 4 is so large that not only bathwater is drawn out of the tub 1 and into the intake port 4', but also ambient air is drawn in through the air-supply conduit 6 and the intake valve 7. Thus a mixture of drawn-out bathwater and aspirated ambient air also forms at the intake port 4'. The bathwater circulating system 2 is preferably operated such that the flow rate of the bathwater is between 10 l/min and 20 l/min, and the flow rate of ambient air relative to the volume in ambient pressure is between 0.5 l/min and 2 l/min. The mixture of bathwater and ambient air is pressurized by the pump 4 and accordingly at a superatmospheric pressure at the output port 4" of the pump 4.

A pressure-reducing valve 8 that serves to build up superatmospheric pressure is connected by a conduit 9 without a chamber for separating the bubbles to the output port 4" of the pump 4. That is, the output conduit 9 is of substantially uniform or the same flow cross section between the output port 4" and the valve 8 so that the mixture of water and air outputted by the pump 4 does not separate between the output port 4" and the valve 8. On the one hand, this pressure-reducing valve 8 serves to hold back the mixture of bathwater and ambient air from the pump 4 to a certain degree and thus to pressurize it with a predetermined superatmospheric pressure. The ambient air thus dissolves into the bathwater in the conduit 9 due to the superatmospheric pressure in the conduit 9 and the thorough mixing of the bathwater and the air in the pump 4. In comparison with ambient pressure, the superatmospheric pressure can for example be 2.5 to 7 bar, in particular 3.5 to 5 bar and particularly preferably 4 to 4.5 bar.

The pressure and flow conditions and the flow rates of bathwater and ambient air are chosen such that the ambient air can dissolve in the bathwater to a large extent, or preferably completely or almost completely, with the result that no, or only very few, air bubbles reach the pressure-reducing valve 8.

In order to achieve as thorough and as complete as possible mixing and dissolving, the conduit 9 in the form of a pipe or a tube is preferably more than 100 mm long, particularly preferably more than 300 mm long. In principle, to achieve as complete a solution as possible, a significant length is advantageous.

An abrupt drop in pressure takes place at the pressure-reducing valve 8 so that the solubility of ambient air in the bathwater decreases accordingly and very small bubbles are formed. The mixture of bathwater and very small bubbles formed in the pressure-reducing valve 8 flows via a second output conduit 10 connected to the pressure-reducing valve 8 to a bubble-water outlet 11 of the tub 1, here located on a side wall of the tub 1. The mixture of bathwater and very small bubbles is ejected at the fluid outlet 11 into the tub 1 that is filled with bathwater above the level of this fluid outlet 11.

The particularly delicate bubbles are sensed by a user as pleasant and invigorating. Due to the large number of very small bubbles, the bathwater clouds up and becomes milky, and in the embodiment of FIG. 1 a lamp 12 is provided opposite the fluid outlet 11 such that light emitted by the lamp 12 is uniformly scattered to create a particularly harmonious color impression, and light refraction at the small bubbles also enhances this milky haze.

As shown in FIG. 3, the bathwater is then drawn out of the tub 1 at the outlet 5, and a flow-impeding effect is achieved either by the cross-section of a water-supply conduit 13 connecting the outlet 5 to the pump 4 or an additional diaphragm 14 is provided in the water-intake conduit 13 such that a subatmospheric pressure results in water-supply conduit 13 and as a result ambient air is drawn in through air-supply conduit 6 and the intake valve 7. FIGS. 1 and 2 show a return conduit 13' below the intake conduit 13 and serving to drain residual water from the pump 4 back into the tub at the outlet 5.

The pressure profile is shown in the different areas purely schematically in FIG. 4. There, a first pressure I that is slightly above ambient pressure is produced within the tub 1 due to the water column there. A subatmospheric pressure II of, for example, −0.1 bar, below ambient pressure, is then set in water-supply conduit 13 due to the suction of the pump 4, with the result that air is drawn in.

The mixture of ambient air and bathwater is then pressurized with superatmospheric pressure III by the pump 4 in combination with the downstream pressure-reducing valve 8, which pressure can for example be between 4 and 4.5 bar. Because of the superatmospheric pressure III, air within the conduit 9 dissolves into the bathwater and, according to the invention, due to the suitable matching of the interacting components, a separate fluid-settling chamber for separating excess ambient air is not needed.

An abrupt drop in pressure takes place at the pressure-reducing valve 8, accompanied by the formation of very delicate microbubbles, and pressure downstream of the pressure-reducing valve 8 corresponds approximately to the pressure inside the tub 1. In the purely schematic representation of FIG. 4, for reasons of simplicity, pressure differences due to the different heights of the water column at the floor drain 5 and outlet 11 are not taken into consideration.

Figure 5A:
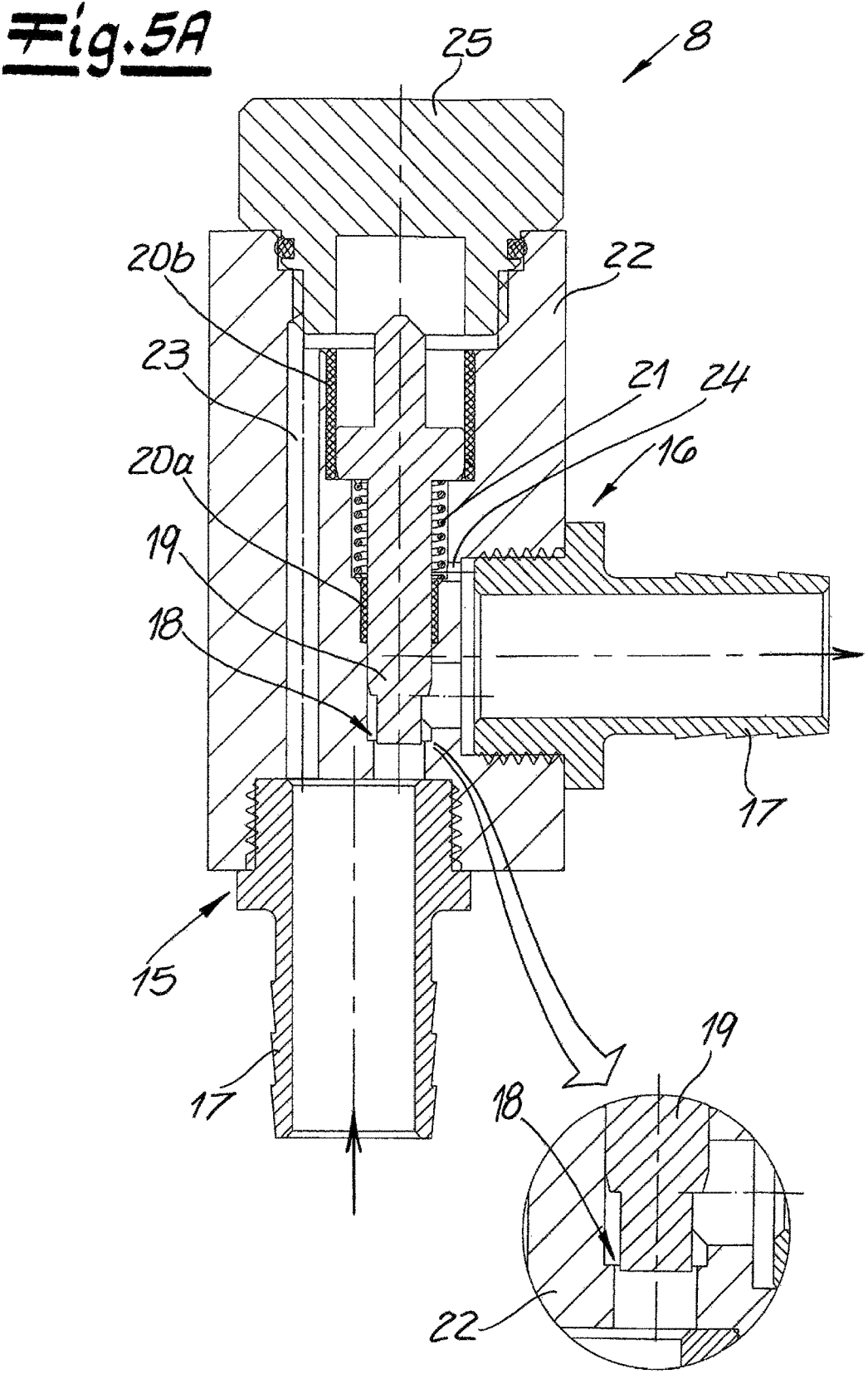
FIG. 5A is a large-scale perspective view of the valve of the supply system in one end position.

FIG. 5A shows a preferred embodiment of the pressure-reducing valve 8 that has a hose connection 17 both at an inlet 15 and also at the an outlet 16. The pressure-reducing valve 8 is in a flow-impeding throttle position in which only a small annular gap 18 is opened up by a valve body 19. This valve body 19 is axially slidable on bushings 20a and 20b and a spring 21 presses against it to force it inside a valve housing 22 of the pressure-reducing valve 8 toward an open position away from the inlet 15 (see FIG. 5B).

In order that valve body 19 can assume the flow-impeding position against the force of the spring 21 according to FIG. 5A, the valve housing 22 has a bypass passage 23 extending from the inlet 15 to a rear face of the valve body 19 turned away from the inlet 15. The valve body 19 has a stepped shape between the bushings 20a and 20b so that it is brought into the flow-impeding position in the event of a superatmospheric pressure at the inlet 15, since its rear face pressurized through the passage 23 is much larger than its front face exposed at the inlet 15. To equalize pressure, the region of valve body 19 around the spring 21 is connected to the outlet 16 via a vent passage 24.

The valve body 19 can be accessed by removing a plug 25 for maintenance and cleaning purposes. This plug 25 is screwed into a rear end of the valve housing 22.

Figure 5B:
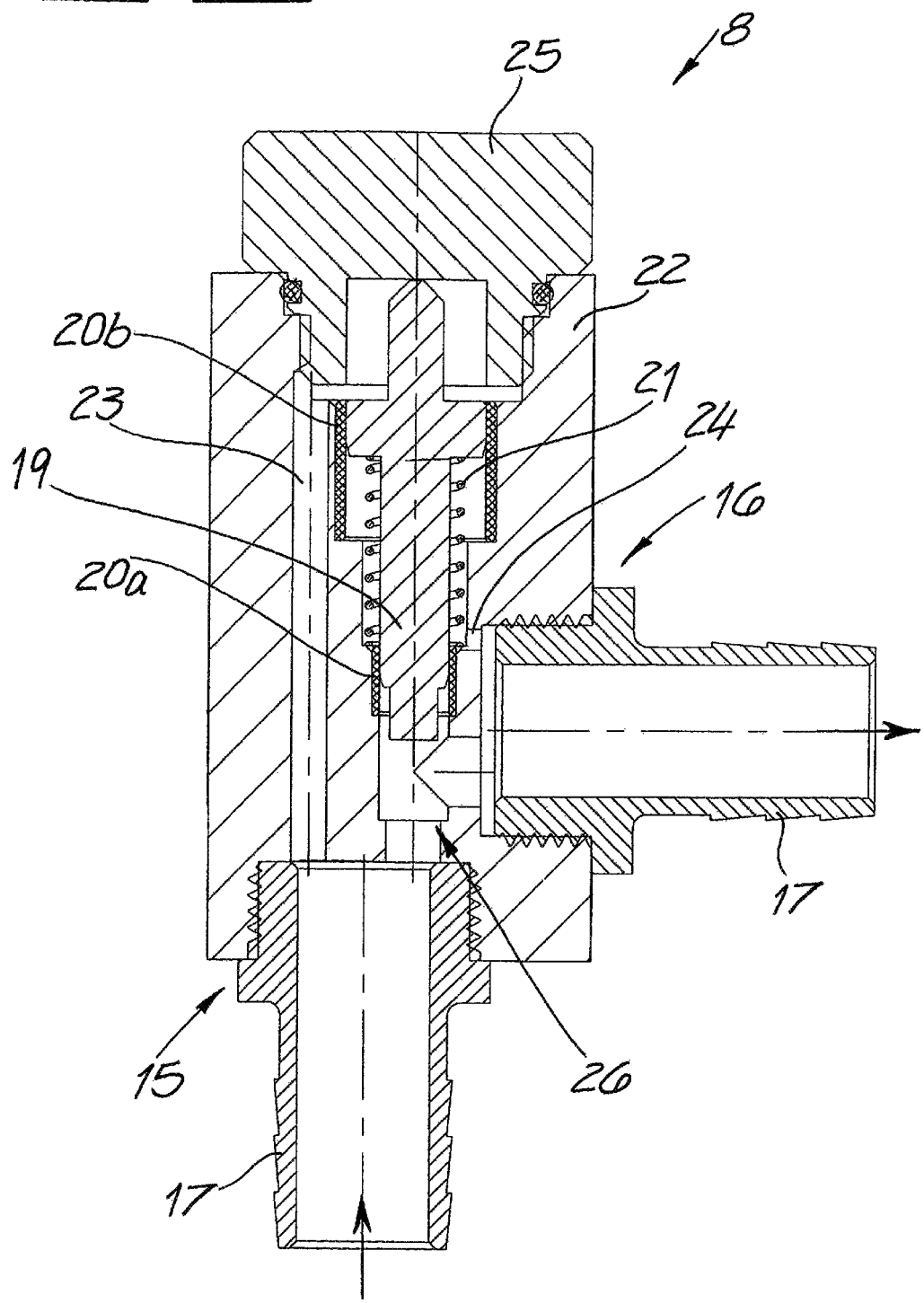
FIG. 5B is a view like FIG. 5A but in an opposite end position.

If the pump 4 is switched off so that superatmospheric pressure ceases to exist at the inlet 15, the spring 21 pushes the valve body 19 axially rearward into an open position shown in FIG. 5B, and a passage 26 of a greater flow cross-section is opened up within the pressure-reducing valve 8 for free flow between the inlet 15 and outlet 16. Impurities previously held back at the annular gap 18 can thus be discharged. In principle, in a modification of this embodiment, the valve body 19 can also be shaped such it is scraped clean on movement into the open position by interacting with the bushing 20a and valve housing 22.

Impurities initially held back at annular gap 18 can be discharged, for example when draining bathwater after opening the pressure-reducing valve 8 or when using the bathwater circulating system, before the valve body 19 moves into the flow-impeding position under pressure control.

FIGS. 6A and 6B or 7A and 7B show alternative designs of the pressure-reducing valve 8 in the flow-impeding position and in the open position.

Figure 6A:
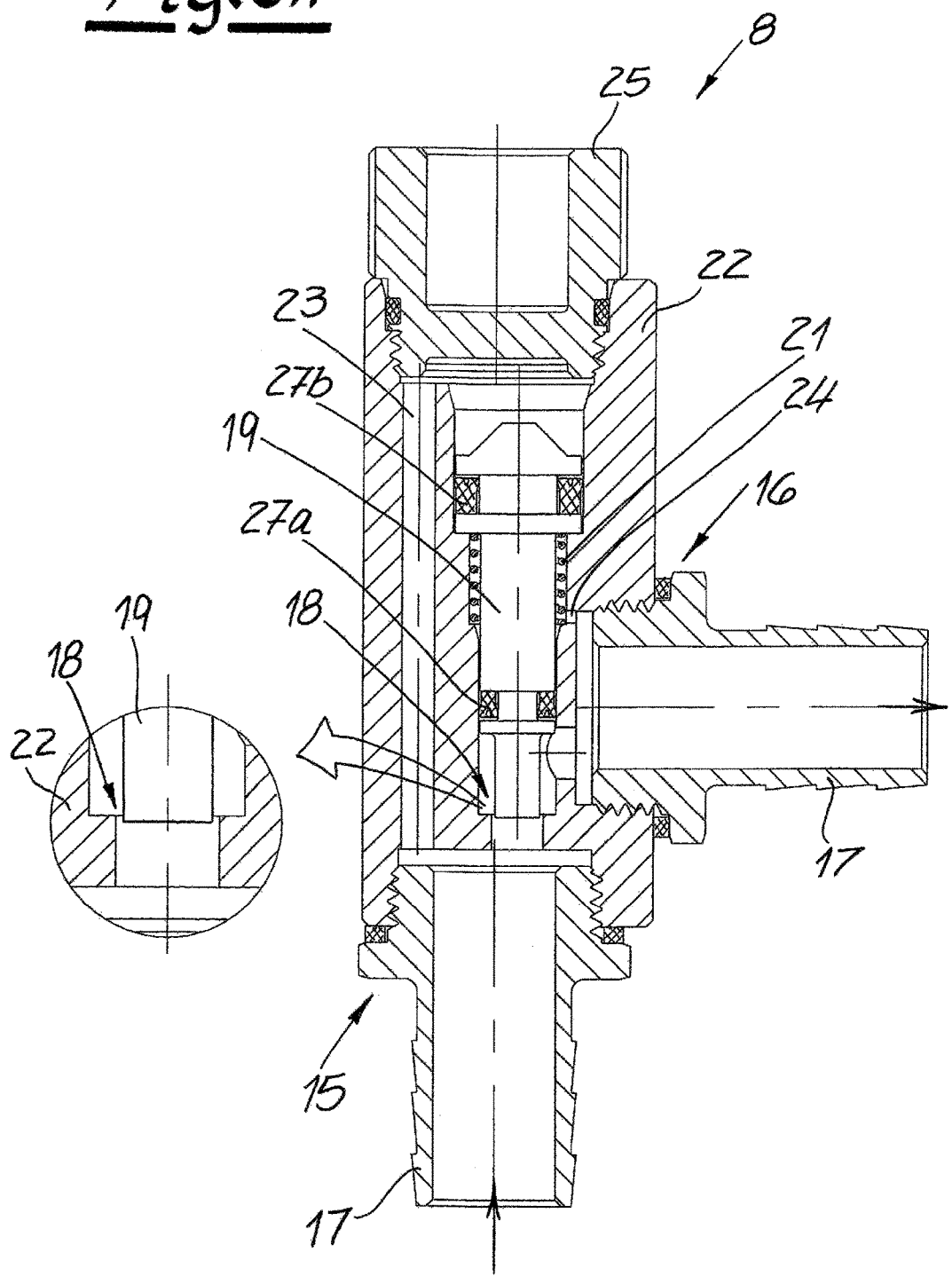
FIGS. 6A and 6B are views like FIGS. 5A and 5*b* showing a second embodiment of the valve.
Figure 6B:
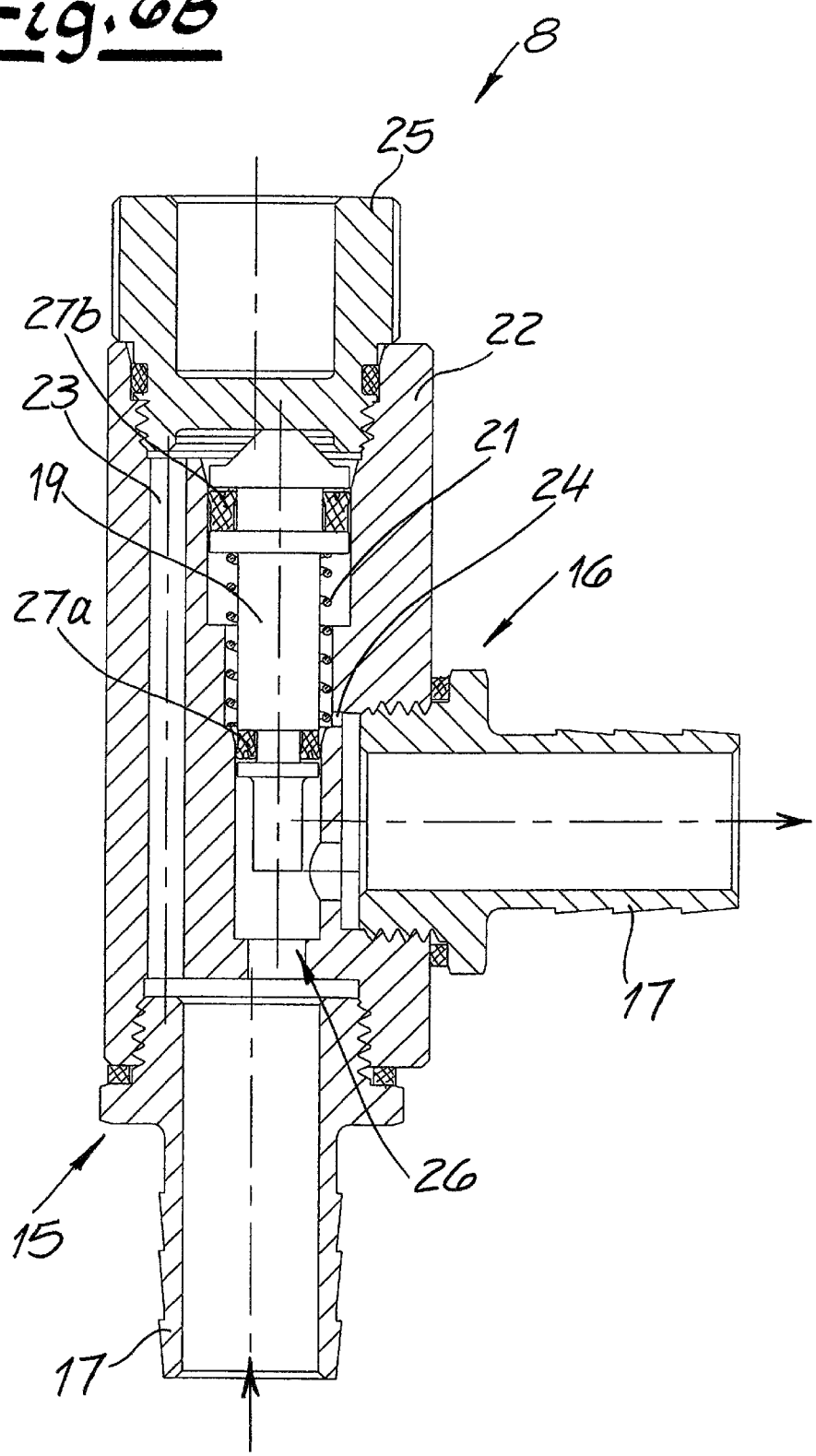

In the second embodiment of FIGS. 6A and 6B, seals 27a, 27b are provided instead of slide bushings 20a and 20b, as a modification vis-à-vis the pressure-reducing valve 8 described above. Each such seals is set in a respective groove of the valve body 19. The slide bushings 20a and 20b or seals 27a, 27b are advantageously chosen such that valve body 19 can slide easily, as a small amount leakage past them is acceptable.

Figure 7B:
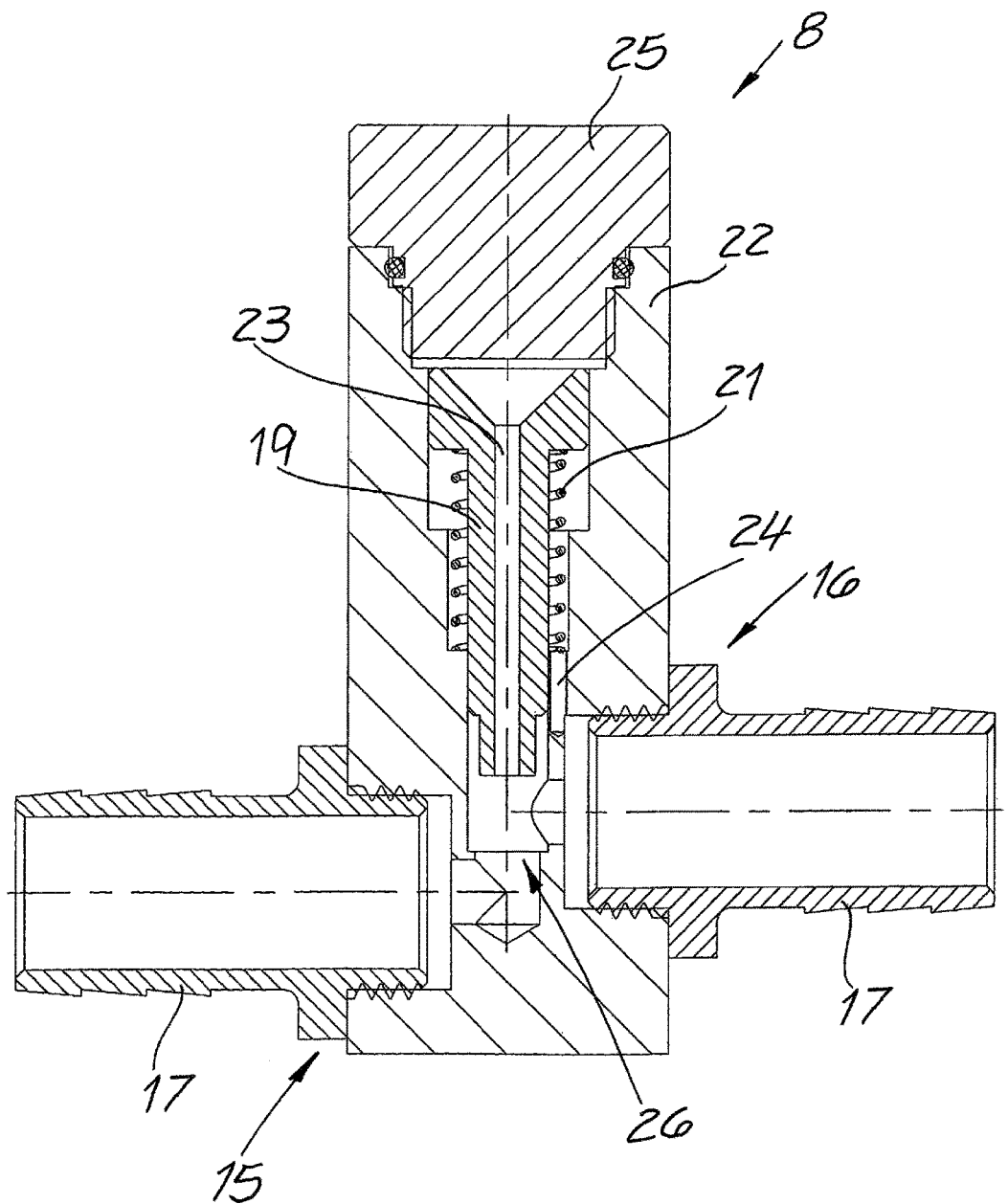

FIGS. 7A and 7B show that the bypass passage 23 is formed not in the valve housing 22 but in the valve body 19. The automatic cleaning effect described above takes place to the same degree.

We claim:

1. A valve for a plumbing system, the valve comprising:
a housing with an inlet and an outlet;
a valve body movable along an axis in the housing between a throttle position with a decreased flow cross section and reduced flow between the inlet and outlet and an open position with a large flow cross section and free flow between the inlet and outlet, the valve body having a front end face directed in one axial direction and exposed to a pressure of the inlet or the outlet and a rear end face directed axially oppositely and of larger surface than the front face;

a spring urging the piston into the open position; and a bypass conduit for applying hydraulic pressure from the one face to the other face of the valve body to shift same into the throttle position when a pressure differential between the inlet and the outlet exceeds a specified value and into the open position in the absence of a pressure differential between the inlet and the outlet, the valve body and housing defining a compensation chamber surrounding the valve body between the faces and a passage connecting the compensation chamber to the outlet.

2. The valve defined in claim 1, further comprising:
a seal between the compensation chamber and at least one of faces.

3. The valve defined in claim 1, further comprising:
slide bushings in the housing slidably supporting the valve body therein.

4. The valve defined in claim 1, wherein the housing has a releasable closure removable for accessing the valve body.

5. The valve defined in claim 1, wherein one of the end faces being of smaller surface area than the other to shift the body into the throttle position when a significant superatmospheric pressure is present at the inlet.

6. The valve defined in claim 5, wherein the bypass conduit is a passage formed in the valve housing.

7. The valve defined in claim 5, wherein the bypass conduit is a passage formed in the valve body.

8. A valve for a plumbing system, the valve comprising:
a housing with an inlet and an outlet;

a valve body movable along an axis in the housing between a throttle position with a decreased flow cross section and reduced flow between the inlet and outlet and an open position with a large flow cross section and free flow between the inlet and outlet, the valve body having a front end face directed in one axial direction and exposed to a pressure of the inlet or the outlet and a rear end face directed axially oppositely and of larger surface than the front face;

a spring braced between the valve body and the housing and urging the valve body into the open position; and a bypass conduit in the valve body for applying hydraulic pressure from the one face to the other face of the valve body to shift same into the throttle position when a pressure differential between the inlet and the outlet exceeds a specified value and into the open position in the absence of a pressure differential between the inlet and the outlet.

9. The valve defined in claim 8, wherein the spring is a coil spring surrounding the valve body.

10. The valve defined in claim 8, wherein the bypass conduit is constructed such that the valve body assumes the throttle position at a pressure differential between 0.5 bar and 3 bar between the inlet and outlet.

* * * * *